(12) United States Patent
Haque

(10) Patent No.: US 6,660,386 B2
(45) Date of Patent: Dec. 9, 2003

(54) FLAME ACTIVATED PRIMER FOR POLYOLEFINIC COATINGS

(75) Inventor: Shah A. Haque, Houston, TX (US)

(73) Assignee: Polymer Ventures, L.L.C., Houston, TX (US)

( * ) Notice: Subject to any disclaimer, the term of this patent is extended or adjusted under 35 U.S.C. 154(b) by 230 days.

(21) Appl. No.: 09/862,134

(22) Filed: May 21, 2001

(65) Prior Publication Data

US 2003/0031799 A1 Feb. 13, 2003

(51) Int. Cl.$^7$ .................. B32B 27/38; B32B 15/08; B05D 1/36; B05D 1/02; C08L 63/00
(52) U.S. Cl. ............... 428/414; 428/413; 428/416; 428/418; 428/500; 428/516; 428/523; 428/332; 427/409; 427/410; 427/421; 427/422; 427/386; 523/400; 523/440; 528/116; 528/117; 528/119; 528/120; 528/121; 528/122; 528/123
(58) Field of Search ................. 523/400, 440, 523/451, 457; 528/87, 88, 106, 116, 117, 119, 120, 121, 122, 123, 124; 428/413, 414, 416, 418, 500, 516, 523, 332; 427/409, 410, 421, 422, 386

(56) References Cited

U.S. PATENT DOCUMENTS

| | | |
|---|---|---|
| 4,213,486 A | 7/1980 | Samour et al. |
| 4,962,137 A | 10/1990 | McKinney et al. |
| 4,985,278 A | 1/1991 | George |
| 5,162,156 A | 11/1992 | Troughton, Jr. et al. |
| 6,174,569 B1 | 1/2001 | Blomer et al. |
| 6,525,159 B1 * | 2/2003 | Okuhira et al. ........... 528/26 |

FOREIGN PATENT DOCUMENTS

| | | |
|---|---|---|
| EP | 0530938 A1 | 3/1993 |
| EP | 0921142 A1 | 6/1999 |

* cited by examiner

Primary Examiner—Robert Dawson
Assistant Examiner—Michael J Feely
(74) Attorney, Agent, or Firm—John R Casperson

(57) ABSTRACT

A primer for flame sprayed polyolefin comprises an epoxy resin, preferably of low molecular weight and/or low viscosity; and an amine hardener, part of which becomes highly reactive on exposure to open flame, providing near instant cure of the composition under flame spray conditions. The invention is unique that it provides strong adhesion to steel, even where the surface preparation is less than ideal, as well as to concrete and other substrates. The primer eliminates the need to preheat the substrate. The primer has strong adhesion to the topcoat polyolefinic material, especially to a functionalized topcoat. The composition withstands open flame and does not char under polyolefin flame spray conditions, nor does it run or sag, and it is not prone to failure as it cools after the application of the polyolefin.

39 Claims, 1 Drawing Sheet

FLAME ACTIVATED PRIMER FOR POLYOLEFINIC COATINGS

BACKGROUND OF THE INVENTION

This invention relates to polymer coatings for a substrate. In one aspect, the invention relates to precoating a substrate with a material which improves the adhesion of the polymer coating.

Many polymer coatings are known. Polyolefin coatings, for example, polyethylene, polypropylene or copolymers thereof with other unsaturated monomers or with acrylates such as acrylic acid or methacrylic acid, or terpolymers like EPDM, containing —C=O, —COOR, etc., or oxidized polyolefins, can be used to provide very high quality coating materials which will protect structures from corrosion. Mixtures of materials, for example polyolefin and epoxy, polyolefin and polyester, or polyolefin and engineering plastics for example, PEEK, or PEAK can also be used. If desired, engineering plastics such as PEEK or PEAK can be used alone.

The major problem encountered with the use of any of these materials is adhesion to the substrate. For coatings, substrates can be classified as metallic and nonmetallic. The most common metallic substrate is steel. Common nonmetallic substrates are concrete, or surfaces which have been previously coated with vinyl, epoxy, or common paints.

In one prior art coating technique, the substrate is heated to 400 F. and then dipped into the powdered polyolefin. In another prior art technique, powdered polyolefin is flocked on the surface of the substrate, generally by electrostatic means, and then cured at 400 F. or above for half an hour or more. This method can only be practiced in a shop or lab and is not suitable for large structures such as bridges, railcars or other large structures which cannot be dismantled or transported to the shop. Also, the technique is not suitable for practice with all substrates, because many nonmetallic substrates, for example vinyl or epoxy coated surfaces may char at that temperature.

Previously, the use of thermoplastics for the purpose of field applied corrosion protection and/or other functional performance has been difficult and provided inconsistent results. The required substrate temperature was very high, difficult to achieve in the field condition. This often resulted in inconsistent adhesion, delamination and premature failure of the topcoat thermoplastics. To further complicate the use of thermoplastics, adhesion to the surface was also dependent upon demanding preparation requirements such as concentrated sandblasting in order to provide a sufficient mechanical profile. The bonding between the substrate and the topcoat was physical in nature.

Given the difficulty of preheating large structures to elevated temperature, and the expenses and other inherent difficulties associated with extensive surface preparation, the introduction and application of a flame-activated primer that eliminates preheating and greatly minimizes the surface preparation would be of great benefit.

To facilitate coating large structures, flame spray application was developed for use in the field. There are several different types, for example, High Velocity Oxy-Fuel (HVOF), Propane torch, Arc Spray, and Vacuum Plasma Spray, are available in the market. However, the simplest one is powder flame spray.

Powder flame spray is a process that deposits finely powdered materials onto a surface in a molten or semi-molten state. The powdered material is fed at a controlled rate to the flame spray gun, which heats the material to the molten or semi-molten state with combustion gases or electricity. Compressed gas then propels the particles to the surface at a speed generally in the range of 10 to 20 meters per second. The particles hitting the surface flatten and conform to the surface, forming the coating. Generally, separate heating or curing is not required.

The resulting coatings are used on a wide variety of applications, from aircraft engine components and biomedical prostheses to bridges and pumps. The coating has several advantages; it covers sharp edges and welds well; it can be used as soon as it cools; there are no runs, drips, sags, or incomplete cure. The coating can also be quench cooled, and small repairs can be done by heating the part to reflow the polymer. The coatings, especially when containing a polyolefin component, have high chemical, impact, and abrasion resistance. Also, the coatings are applied in a solvent-free procedure, avoiding VOC emissions.

Despite these advantages and lucrative applications, flame spray technology has not flourished because it also has several disadvantages.

In order to provide reasonably good adhesion, the substrate must be activated by preheating to 400 F. or above before flame spraying the powder. This is difficult (and expensive) to do with large structures such as bridges. It is also generally necessary to clean rusted steel substrate to at least Standard SP-10 and to remove any old coating, such as vinyl, epoxy or other paint as it cannot withstand such preheating temperature. These cleaning steps can add substantial expense and time requirements. Post application problems include damage to the polymer coating caused by excessive heat exposure on the preheated substrate, poor adhesion caused by inadequate preheating, shrinkage, poor dimensional stability, poor or no adhesion to the substrate.

It is an object of this invention to provide a coating method and system that avoids the need to preheat the substrate.

It is another object of this invention to provide a coating method and system that avoids the need to carefully pre-cleaning the substrate.

It is a further object of this invention to provide a coating method and system in which the coating has good dimensional stability and exhibits little or no shrinkage on cooling.

It is yet another object of this invention to provide a highly protective and long-lived coating for a substrate.

SUMMARY OF THE INVENTION

In one embodiment, the invention comprises a composition based on an epoxy resin and amine hardener that may be used to prime a substrate to facilitate subsequent bonding of a polyolefin material which may be sprayed thereon. The invention is especially useful where open flame is used, i.e., where the polyolefin is flame sprayed on the primed surface. A monolayer thickness of the primer is preferred. However, the primer can be air sprayed as a thin coat of visual thickness on the substrate and will provide very good adhesion of the topcoat with minimal surface preparation of the substrate.

The primer composition comprises an epoxy resin, preferably of low molecular weight and/or low viscosity and an amine hardener, part of which becomes highly reactive on exposure to open flame, thus providing near instant cure of the composition under flame spray conditions. Optionally, the primer composition can include a solvent to facilitate spray where required.

The invention is unique that it provides strong adhesion to steel, even where the surface preparation is less than ideal, as well as to concrete and other substrates. It also has strong adhesion to the topcoat polyolefinic material, especially to a functionalized one. The composition withstands open flame and does not char under polyolefin flame spray conditions.

The physical advantages provided by the coating system of present invention are: (1) the adhesion of the topcoat to the substrate, (2) the adhesion of the primer to polyolefin topcoat, (3) the dimensional stability of the topcoat, (4) an exceptional peel strength (both 180 and 90 degree peel) of the topcoat, (5) an exceptional pull strength (hate test) of the topcoat, (6) the provision for very good cathodic protection of the substrate, and (7) the prevention of water permeation underneath the coating system.

The advantages provided by the application method of the invention are:: (1) instant cure on exposure to open flame, and concurrent bonding with the substrate and topcoat polyolefins, (2) avoiding the preheating of the substrate, (3) avoiding careful cleaning of the substrate, (4) the ability to apply the coating system on a rusty substrate, (5) ease in avoiding runs and sags in the coating as it bonds on cure, and (6) the long working pot-life of the primer.

DETAILED DESCRIPTION OF THE INVENTION

Figure 1:
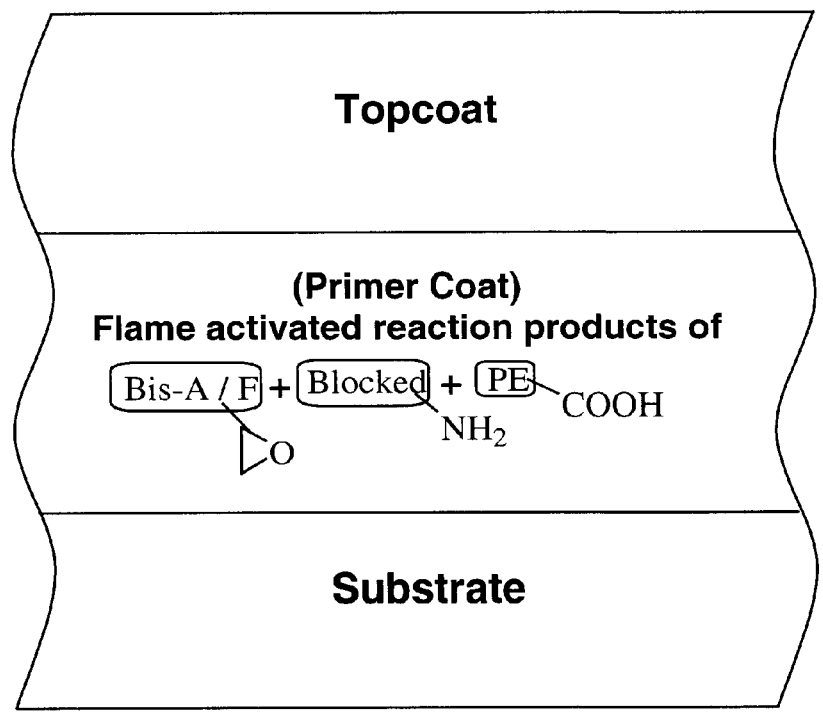
FIG. 1 schematically illustrates a substrate-primer-coating lay up according to one embodiment of the invention.

According to one embodiment of the invention, a primer is applied to a substrate and then a thermoplastic topcoat is applied to the primer.

The Substrate

The inventive primer can be applied to any desired substrate. However, it is expected to find its greatest utility for application to steel or concrete substrates, or substrates that have been previously coated with polymer, for example, vinyl, polyester or epoxy. The invention can be applied to such substrates in the shop or in the field. However, it is expected to find its greatest utility when applied in the field, where its advantages are highly unique. Examples of specific applications include tanks, containment vessels, containment dikes, industrial support structural steel, pipe and other transfer apparatus, process equipment, piers, offshore platforms, railcars, bridges, ships, barges, dams and locks, wastewater treatment equipment and apparatus, and bulk loading equipment.

Preparation of the Substrate

The substrate needs to be free of loose, unsound, poorly adhered, contaminated and/or detrimental matter including oils and grease. For new or lightly weathered steel, non-mechanical cleaning will often suffice. Cleaning methods such as Power Tool, Hand Tool, and/or Solvent or Water Solution Washing or Power Washing such as, for example, with soap or detergent, may be employed. If desired, steel substrate can be lightly cleaned by mechanical means other than heavy sand-blasting. It is generally unnecessary to provide a more thorough cleaning except for aesthetic purposes.

The surface of the substrate is then preferably air dried for best results.

Application of the Primer to the Substrate

Nonporous Substrates Such As Steel

For steel or other smooth nonporous substrates, a minimal and preferred effective amount of the primer is believed to be a monolayer. This can be achieved by diluting the primer with a suitable solvent (0.1 to 80% primer by weight), spraying the diluted primer solution onto the substrate, and the air drying the wet primer coat.

For practical purposes, the primer is effective when applied in any visible amount. A thinner coat is generally more desirable than a thicker coat from the standpoint of performance and low VOC emissions. The primer is thus described as effective when applied to at least a monolayer thickness, generally to a thickness of at least 0.01 mils, usually to a thickness of at least 0.1 mils, and often to a thickness of at least 0.5 mils. The primer is generally applied so that its thickness does not exceed 10 mils, preferably so that its thickness does not exceed 3 mils, and most preferably so that its thickness does not exceed 1 mil. When expressed as a range, the most preferred thickness range is from monolayer up to about 1 mil, because this compromise gives a good balance of economy, strength, and ease of application. For this application, the primer is preferably applied in a relatively thin liquid form by any suitable technique and suitable solvent can be added to thin the primer. Air-atomized spray application is preferred.

Porous Substrates Such As Concrete

For concrete or other rough porous substrates, the primer is generally applied to a thickness of at least 1 mil, preferably to a thickness of at least 5 mils, and more preferably to a thickness of at least 10 mils. Preferably, the primer is modified for use on porous substrates, which generally contain trapped air that expands during flame spraying. Such modifications may include adding a compatible modified clay (for example, an amine-functionalized clay), and/or a copolymer such as ethylene-acrylic acid copolymer which can be used either alone or in its neutralized form such as its zinc or sodium salt. The primer is applied so that its thickness generally does not exceed 100 mils, usually so that its thickness does not exceed 70 mils, and preferably so that its thickness does not exceed 50 mils. For this application, the primer is preferably applied in a relatively thick liquid form by any suitable technique. Using primer having a paste-like consistency and application by trowel is preferred. Roller or brush application is also expected to be useful.

It has been observed that a temperature gradient exists across the primer during the flame spraying of the topcoat. The gradient helps prevent out-gassing from porous substrates and is more pronounced with thicker primer coats. When expressed as a range, the most preferred thickness range of primer is from about 5 mils to about 50 mils on a porous substrate, because this compromise gives a good balance between economy, freedom from imperfections caused by out-gassing, and ease of application.

For porous substrate such as concrete, the modified primer is allowed to age for several hours, such as in the range of from 5 to 20 hours, usually 12 to 16 hours, preferably overnight, before flame spraying. Shorter aging times may be used at mildly elevated temperatures. This technique provides concrete pores and any gaps to be repaired, and provides a pinhole free surface for the application of the topcoat. Most importantly, aging the primer in this manner helps stop out-gassing from the concrete during the flame spraying procedure.

Characteristics of the Primer

The primer can generally be described as a resin/hardener composition that has been formulated so as to partly but not fully cure in few minutes at room temperature, and remain in a partially cured state for several hours to several days at room temperature. It then quickly reaches full cure in a matter of seconds without burning or charring the material when exposed to open flame.

In its partially cured state, the primer comprises epoxy resin having both reacted and reactive terminal epoxy groups. The reacted terminal epoxy groups have been reacted with a fast acting amine curing agent to provide the partial cure of the partly cured primer composition The resin/hardener composition has a resin component and a hardener component.

The Resin Component

The resin component is generally an epoxy resin represented by the formula:

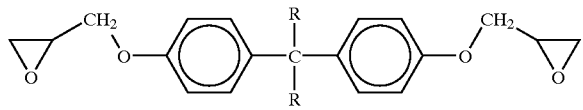

Where, preferably, R=H (Bis-F resin) or R=CH$_3$ (Bis-A resin). Examples of suitable materials are commercially available as EPON 862, EPON 828, EPALLOY 8220, etc.

The resin can optionally contain diluents. Aromatic hydrocarbons are suitable. For example, toluene or xylene will provide good results. It is preferred that the diluents are free of functional groups, for example —OH, —C=O, —COOR, etc, as these materials may be detrimental to open-flame activation.

The Hardener Component

The hardener component is generally a mixture of amines that has dual type of amine functionality. In the former part, it is fast-acting amine curing agent. In the remaining part, it is dormant amine curing agent which acts very fast on exposure to the flame.

The Fast Acting Amine Curing Agent

The fast-acting amine curing agent has unblocked amine functionality. This unblocked amine functionality is conventionally reactive with the epoxy at room temperature and provides a partial cure of the epoxy component in a few minutes under preferred conditions of use. Generally speaking, the at least one fast acting amine curing agent comprises a polyamine, a polyamide, or a polyamidoamine having from 6 to 20 carbon atoms and comprising multiple terminal amino groups.

The fast acting amine curing agent generally comprises a polyamine, a polyamide, or a polyamidoamine, usually a diamine, diamide, or diamidoamine which reacts in a stoichiometric fashion with the epoxy resin. In order to provide a partial cure, the fast acting amine curing agent is added in less than a stoichiometric amount.

The fast-acting amine curing agent is generally present in the hardener as a compound or mixture of compounds. Compounds suitable for use as the fast-acting amine curing agent include meta-xylenediamine (MXDA).

The fast acting amine curing agent is used in an amount which is sufficient to stop running or sagging of the primer, either on application or when exposed to the flame. Generally speaking, the amount is sufficient to provide at least 10% of the stoichiometric amount of amine required to quantitatively react with the terminal epoxy groups of the epoxy component, preferably at least about 30% of such stoichiometric amount, and more preferably at least about 40% of the stoichiometric amount. The first compound is used in an amount which is less than the amount required to quantitatively react with 90% of the terminal epoxy groups of the epoxy component, preferably less than the amount required to react quantitatively with 70% of the epoxy groups, and more preferably less than the amount required to react quantitatively with 60% of the terminal epoxy groups.

The Flame-Activated Amine Component

The flame activated amine curing agent has blocked amine functionality. The blocked amine functionality comprises an amine group that is physically or electronically blocked from reacting with the epoxy component by another group. Generally, the blocked amine functionality is associated (capped) with a moiety (generally carbamate or carboxylate) which renders it chemically inactive or poorly reactive with respect to the epoxy at room temperature. Preferably, the flame activated amine curing agent comprises multiple terminal amino groups which have been blocked by carbamate or carboxyl functional groups. Exposure to open flame decaps (activates) the previously blocked amine and snap cures the epoxy/amine primer within a matter of seconds under conditions of use.

The flame activated amine curing agent can contain one or more amines which, after flame activation, react either stoichiometrically or catalytically with the epoxy resin, preferably so as to provide a complete cure. That is, after flame activation, at least one amine curing agent is formed and it can be either a reactive amine curing agent or a catalytic amine curing agent. Compounds or mixtures of compounds can be employed as the flame activated amine curing agent if desired.

An example of a blocked reactive amine curing agent is Diak #1 (physical block-hexamethylene diamine carbamate). After activation, this material yields highly active primary diamine as shown below:

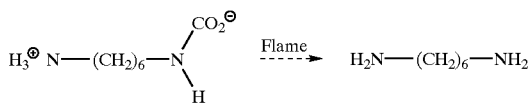

Another example is Diak # 4, which has the chemical name 4,4'-methylene-bis(cyclohexylamine) carbamate, and which, after activation, has the formula (right side of the arrow):

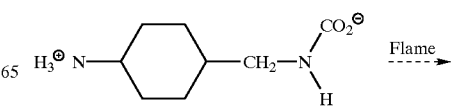

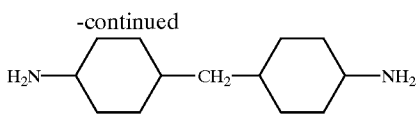

An example of a blocked catalytic amine is 2-methyl-4-ethylimidazole (electronic block, geometry orients to preferred configuration on exposure to flame, and acts as catalyst in epoxy cure) as shown below:

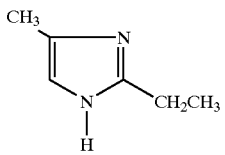

The purpose of the flame activated amine curing agent is to give complete cure of the primer when it is subjected to open flame. Blocked reactive amines are preferably used in near-stoichiometric amounts, based on the amount of remaining epoxy which has not reacted with the fast acting amine curing agent. Blocked catalytic amines are preferably used in an amount sufficient to provide a snap cure of the primer.

Optional Ingredients

The primer can optionally contain fire retardant, for example zinc and/or antimony oxide, and/or halogenated compounds such as, Saytex 120E (decabromodiphenyl oxide), Saytex1120 (tetradecabromodiphenoxy benzene), Saytex BT-93 (ethylenebistetrabromo-phthalimide), Saytex RB-100 (tetrabromobisphenol A), etc.

The fire retardant may be used in amounts of from about 0.1 weight percent to about 10 weight percent.

Application of the Topcoat

The topcoat is applied to the substrate after the primer. The topcoat is preferably a thermoplastic polymer, generally an olefinic polymer. Preferably, the olefinic polymer is flame sprayed onto the primer. Known techniques of flame spraying can be used.

When flame spraying is employed, particles of the preferably olefinic polymer are melted by a flame and sprayed against the primer to form a protective coat of the desired thickness in one or more coats. The olefinic polymer, in powdered form is mixed with controlled gaseous streams of an oxidant (usually air) and fuel (usually propane) in a nozzle. The mixture is subsequently ignited and directed against the substrate. The heat from the resulting flame melts the powdered olefinic polymer into a molten state which is then sprayed against the primer, generally at velocities in the range of 10 to 20 meters per second.

The flame spraying process activates the blocked amine. A monolayer of primer will be instantaneously activated by the flame and react chemically with the topcoat (—COOH of topcoat reacts with epoxy ring of primer, activated amine may also take part in the reaction). At the same instant the primer bonds (probably chemically) with the metallic substrate. A coat of a molten functionalized olefinic polymer of desired thickness may be built over the primer without charring or decomposing up to a maximum temperature of about 600° F.

Composition of the Topcoat

The topcoat comprises a thermoplastic polymer. Preferably, the thermoplastic polymer comprises an olefinic polymer, although other thermoplastics, for example, engineering thermoplastics can be used as well. The olefinic component is generally polyolefin, for example, polyethylene or a polyethylene copolymer, although other polyolefins, for example, poly-α-olefin such as polypropylene, can be used if desired. The olefinic component preferably contains carboxyl functionality, because this is believed to react with the primer under the conditions of the flame and thus provide better adhesion. Copolymers of ethylene with acrylic acids can provide the desired functionality. An acrylic or methyl acrylic acid copolymer with ethylene (EAA or EMAA), or a mixed composition or a salt which forms an ionomer is expected to provide good results.

If unfunctionalized olefinic polymer is employed as a topcoat, it is preferred to first apply a thin coat (generally 2–10 mils) of functionalized polymer on the primer and then to flame spray the unfunctionalized olefinic polymer.

Generally speaking, the topcoat will have a thickness of at least one mil, usually at least 5 mils, and preferably at least 10 mils. The maximum thickness generally is economically limited. Generally speaking, the topcoat will have a thickness of less than 100 mils, usually less than 70 mils, and preferably less than 30 mils.

The Coating System

Nonporous Substrates Such As Steel

The primer is most effective when applied to metal substrates as a monolayer. However, a microscopically thin layer, for example to the order of less than 0.1 mils (0.0001 inches) will also be effective. Slightly thicker application is also acceptable. The flame-activated primer has the following attributes:

The primer may bond chemically with metal substrates, due to chemical association and/or reaction between Fe and N or O.

It does not require abrasive blasting of the steel. Minimal surface preparation is as follows (described as have been set by the Steel Structures Painting Council (SSPC) and the National Association of Corrosion Engineers (NACE):

For new or lightly weathered steel structures, a non-mechanical cleaning method will provide satisfactory results. The cleaning is referred to as SSCP-SP1 solvent wipe, which is defined as the removal of oil and grease surface contaminants using solvent cleaning. We have obtained good results by employing a detergent wash to remove the oil and grease surface contaminants. For old, previously coated or rusty structures, cleaning to SSPC-SP-2 or SSPC-SP-3 standards, i.e., the removal of loose mill scale, loose rust and loose coatings hand, power tools, or particle blasting will provide good results. Of course, more extensive cleaning will also provide good results, but SSPC-SP-10 standard is generally unnecessary and very expensive.

a. Remove all loose, unsound, poorly adhered, contaminated and/or detrimental matter including oils and grease from the surface. (Cleaning methods such as Power Tool, Hand Tool, and/or Water Solution Washing may be employed.)

b. Air dry and/or flame dry excess moisture.

The flame-activated primer chemically bonds to bare steel even in the presence of slight rust bloom. Once the flame-activated primer is applied to the steel substrate, it will remain ready to accept mild pre-warming and a thermoplastic topcoat for up to 24 hours.

Flame-activated primer cures in such a precise manner that it bonds simultaneously to the steel-substrate and the topcoat when flame sprayed. This is accomplished by prewarming the surface of primer above 150 F. (to remove surface moisture) briefly just before a thermoplastic topcoat is flame-sprayed. The intense flame immediately activates the primer setting chemical (and physical) reaction with the substrate and the polyolefinic topcoat, described as a "Snap Cure" by "Flashkinetics". Formulations which have been tested with good results require a 15 second snap cure. By nature of the bond and its chemical composition, the flame-activated primer acts as an anti-corrosion agent.

Porous Substrates Such As Concrete

Flame-activated primer also works in a similar manner on concrete substrates. Usually a concrete surface is rough, and out-gassing of entrapped air is a huge problem. The primer is reformulated to address these problems. The flame-activated primer is trawled to fill the gaps and smoothen the surface of the concrete. It is preferably allowed to partially set for an 8 to 10 hours prior to flame spraying the topcoat.

In this case primer may flow into any surface imperfections in the substrate and form physical interlocks with the substrate. The topcoat is flame sprayed against the primer at considerable velocity at a point in time when the primer is only partially cured. The topcoat probably penetrates the primer to some extent, creating physical interlocks.

In both nonporous and porous applications, the topcoat may bond chemically with the primer coat, due to chemical association and/or reaction between carboxyl functionality in the topcoat and epoxy/amine functionality in the primer composition. The coating system, after cure, can be described as a layer containing both primer components and/or their reaction products and topcoat components and/or their reaction products which is enriched in the former adjacent to the substrate and in the latter adjacent to the outer surface.

Additional Aspects of the Invention

In one aspect flame-activated primer may be applied at any level of humidity, even in the rain, by first driving off moisture on the surface of the substrate by air or flame drying.

In another aspect, the flame-activated primer adheres very well to steel substrate and the thermoplastic topcoat. The adhesion bond strength is more than 1500 psi. Often the topcoat fails cohesively rather than the primer bond. Concrete yields much before the primer bond failure.

Figure 2:
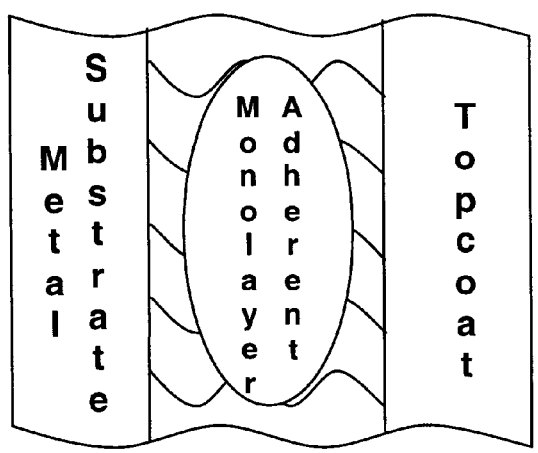
FIG. 2 schematically illustrates another substrate-primer-coating lay up according to another embodiment of the invention.

In a further aspect, the invention relates to an adhesion promoter (basecoat) for a flame sprayed polyolefin topcoat. The invention is not a thermoplastic over thermoset coating in the known sense. In the invention, at least a monolayer of flame-active primer is applied to improve adhesion of the thermoplastic (or thermoset or partially thermoset) topcoat material, generally as depicted in FIG. 1 and more precisely as shown in FIG. 2.

Monolayer application is possible by diluting the primer with suitable hydrocarbon solvents and fine spraying. However, this may be applied in thicker form although the bond quality may be slightly inferior.

In one embodiment, the substrate is steel structure, very often having a poorly prepared surface, which cannot be coated directly using flame sprayed polyolefin (unmodified or modified). The flame-activated primer provides a strong bond to the steel substrate as well as to a polyolefinic topcoat material. It also eliminates the requirement of near white metal surface preparation (SSPC-SP-10), preheating the substrate to high temperature (>350° F.), and fusion bonding. While the flame-activated primer does not require preheating, it tolerates surface warming up to 150° F.

The flame-activated primer composition can be modified to seal concrete, prevent out-gassing, and at the same time constitute a suitable basecoat for flame spraying the polyolefin topcoat. It may also be used on concrete already coated with vinyl, epoxy, polyurethane or other materials without removing them.

A preferably monolayered flame-activated primer can be characterized as an adhesion promoter for substrates to be coated with polyolefin(s), epoxy, polyesters, hybrid materials, engineering thermoplastics like PEEK, PEAK, Teflon etc. by flame spraying. The invention is also equally useful for powder coating technology using electrostatic, dipping, or flocking methods. The primer provides a strong bond to a range of substrates as well as to the topcoat material. This is similar to a double sided adhesive tape, adhering to substrate and the topcoat.

The invention is hereinafter described as it would be used to coat a steel substrate, although it is to be understood that, as a whole, the inventive coating system is suitable to protect steel, concrete, vinyl, and many other substrates. The inventive coating system has dimensional stability, low temperature flexibility (32° F. or below), high thermal stability (500° F.), and fire-resistance.

Commercially available epoxy/amine material cannot be used in flame spray application. The majority of epoxy materials are designed for room temperature curing. A few of them are designed for a heat cure system. However, applying a direct flame on a conventional epoxy composition leads to charring and decomposition. This causes out-gassing, blistering of the topcoat, and poor bonding to the topcoat. The topcoat polyolefin will not adhere well to epoxy if it is fully cured before flame spraying the topcoat.

High temperature curing amine (N-containing) materials have been commercially available. For example, cyanoguanidine (CG-1400), may be used as high temperature curative for epoxy resin. Using such material, however, has three inherent defects. One, it needs long time to cure at elevated temperature. When heated, the epoxy composition turns water like and starts flowing down the vertical substrate. Two, uncured epoxy composition is subject to flammability. Three, delayed cure fails to prevent shrinkage of the topcoat polyolefin. It also causes adhesion failure to the substrate. Epoxy/cyanoguanidine thus does not make a good flame-activated primer system for flame spraying polyolefin.

In view of the above, it is necessary to have a snap cure system using flash kinetics mechanism. The flame-activated cure system provides very short cure time (less than 15 seconds) to cure fully when subjected to flame, to effect a strong bond. Also, the rapid cure provides stress release for the topcoat polyolefin when cooling (from contraction) (primer cured within 15 sec keeps topcoat in place, preventing contraction during cooling). This aspect of the present invention provides such a material composition, and the method of application.

Another required characteristic of the primer is that it must remain soft enough for the topcoat to penetrate into it. The composition of the flame-activated primer is such that provides a partial cure of the epoxy at room temperature to adhere it to the substrate and to prevent flow down on sudden heat flux (flame application), but at the same time soft enough for topcoat to adhere to it.

The primer composition does not decompose when subjected to open flame, nor catch fire. When exposed to flame, it cures quickly to lock topcoat polyeolefin in its place and prevents dimensional deformation.

The invention is further illustrated by the following examples:

EXAMPLE 1: (COMPARATIVE) LOW TEMPERATURE CURE COMPOSITION

| RESIN (PART-A) | |
|---|---|
| Bis-A Epoxy (Epon 828) | 73.8 |
| Epoxy diluent (CGE)- | 8.4 |
| Epodil L | 12.2 |
| BYK070 | 0.3 |
| BYK341 | 0.3 |
| Methanol- | 4.0 |
| HARDENER (PART-B) | |
| Amidoamine (Ancamine 502) | 70 |
| Aliphatic amine (Ancamine 1608) | 8 |
| Accelerator amine (Versamine 645CE) | 7 |
| Modified amine (Versamine 641) | 15 |

CGE is cresyl glycidyl ether. Epodil L is obtained from Neville Corporation. All BYKs are from BYK-Chemie, USA.

A. The resin and hardener were mixed in a 1/1 ratio by weight and applied on sand blasted steel as a flame-activated primer (~1–3 mil). Immediately PF113 (formulated poly (ethylene-methacrylic acid), EMAA) was flame sprayed as topcoat. The flame temperature was controlled around 400 F. The primer started burning and decomposed. The bond to the topcoat was poor.

B. Fire retardants were added to the resin (0.5% $Sb_2O_3$ and 1.5% ZnO by weight) and to the hardener (1% BT-93 supplied by Albemarle). The modified resin and hardener were mixed 1/1 (by weight) and applied on sand blasted steel as a primer (~1–3 mil). PF113 was immediately flame sprayed as topcoat. The primer did not burn but it started sliding down the vertical surface of the substrate. The topcoat shrunk as it cooled, and partly disbonded from the substrate.

C. Same as (A). It was then cured over night at room temperature. It did not run down when PF113 was flame sprayed. However, the topcoat did not adhere on the already cured primer.

EXAMPLE 2: (COMPARATIVE) HIGH TEMPERATURE CURE COMPOSITION

| RESIN (PART-A): | As in example-1 |
|---|---|
| HARDENER (PART-B): | |
| (Cyanoguanidine) CG-1400 | 88 |
| $Sb_2O_3$ | 0.5 |
| BT-93 | 1.5 |
| Phenolics (P-105) | 10 |

P-105 was obtained from Akrochem Corporation. The resin and the hardener were mixed in a ratio of 10/0.5 by weight and applied a thin film over a steel substrate. PF 113 was then flame sprayed at temperature ranging between 350–550° F. The composition started running down and did not cure instantaneously. Shrinkage of the topcoat was observed. Increasing the amount of hardener up to 20% did not improve the situation. CG-1400 alone did not provide cure of the system. Partial decomposition of the composition could not be prevented.

Commercially available primers, for example, 7P-0200 (Morton Powder Coating) have been tried. Flame spraying decomposed the product partially and bond failure of the topcoat was observed.

EXAMPLE 3 (INVENTION) CHEMICALLY CAPPED AMINE FORMULATION

| RESIN (PART-A): | As in example-1 |
|---|---|
| HARDENER (PART-B) | |
| (end-capped amine) Diak #1 | 50 |
| Amidoamine (Ancamine 502) | 48 |
| $Sb_2O_3$ | 0.5 |
| BT-93 | 1.5 |

Resin and hardener were mixed in a 1/1 (by weight) ratio, applied very thin on the steel substrate, and allowed to cure over night (12–16 hours). This provided partially cured, soft material. Flame sprayed topcoat (PF113) did not run down the flame-activated primer. The flame-activated primer did not catch fire or decompose. A tight, cured coating system was obtained.

Replacing amidoamine with other amines like 1,4-diphenyldiamine produced a similar result. The composition did not work in absence of Diak#1.

EXAMPLE 4 (INVENTION) ELECTRONICALLY CAPPED AMINE

| RESIN (PART-A): | As in example-1 |
|---|---|
| HARDENER (PART-B): | |
| (Imidazole derivative) EMI 24 | 50 |
| Amidoamine (Ancamine 502) | 48 |
| $Sb_2O_3$ | 0.5 |
| BT-93 | 1.5 |

Resin and hardener are mixed in a 1/1 weight ratio, applied very thin on the steel substrate, and allowed to cure over night (12–16 hours). This provided a partially cured, soft material. Flame sprayed topcoat (PF113) did not run down (prevented by partial cure) the primer. The flame-activated primer did not catch fire or decompose. A tight, cured coating system was obtained. The composition did not work in absence of EMI 24 which is 2-ethyl-4-methyl imidazole.

EXAMPLE 5 (INVENTION) USE OF CHLORINATED DILUENT

| RESIN (PART-A) | |
|---|---|
| Bis-F Epoxy (Epon 862) | 100 |
| HARDENER (PART-B) | |
| (Imidazole derivative) EMI 24 | 5 |
| Amidoamine (Epicure 3164) | 100 |
| (Chlorinated diluent) LV-50 | 20 |
| $Sb_2O_3$ | 1.0 |
| BT-93 | 3.0 |

The resin and hardener were mixed in a 2/1 (by weight) ratio, and applied very thin on the steel substrate. The substrate was warmed to 150° F. by the flame, and topcoat PF113 was flame sprayed. The flame-activated primer bonded to the substrate and topcoat. No shrinkage of topcoat was observed.

EXAMPLE 6 (INVENTION)
USE OF ELECTRONICALLY CAPPED AMINE WITHOUT DILUENT

| RESIN (PART-A) | |
|---|---|
| Bis-F Epoxy (Epon 862) | 100 |
| HARDENER (PART-B) | |
| (Imidazole derivative) EMI 24 | 5 |
| Amidoamine (Epicure 3164) | 100 |
| $Sb_2O_3$ | 1.0 |
| BT-93 | 3.0 |

The resin and hardener were mixed in 2/1 (by weight) ratio and applied very thin on the steel substrate. The substrate was warmed to 150° F. by flame, and topcoat PF113 was flame sprayed. The flame-activated primer bonded to the substrate and topcoat. No running down or shrinkage was observed.

EXAMPLE 7 (COMPARATIVE)
WITHOUT ELECTRONICALLY CAPPED AMINE (EMI 24)

| RESIN (PART-A) | |
|---|---|
| Bis-F Epoxy (Epon 862) | 100 |
| HARDENER (PART-B) | |
| Amidoamine (Epicure 3164) | 100 |
| $Sb_2O_3$ | 1.0 |
| BT-93 | 3.0 |

The resin and hardener were mixed in 2/1 (by weight) ratio and applied very thin on the steel substrate. The substrate was warmed to 150° F. by flame, and topcoat PF113 was flame sprayed. The flame-activated primer bonded to the substrate and topcoat. Running down, shrinkage, mild blistering, and poor bonding was observed.

EXAMPLE 8 (INVENTION)
USE OF ELECTRONICALLY CAPPED AMINE WITH ADDED PRIMARY AMINE

| RESIN (PART-A) | |
|---|---|
| Bis-F Epoxy (Epon 862) | 100 |
| HARDENER (PART-B) | |
| (Imidazole derivative) EMI 24 | 15 |
| Amidoamine (Epicure 3164) | 70 |
| (aromatic diamine) MXDA | 10 |
| $Sb_2O_3$ | 1.0 |
| BT-93 | 3.0 |

The resin and hardener were mixed in 2/1 (by weight) ratio and applied very thin on the steel substrate. The substrate was warmed to 150° F. by flame, and topcoat PF113 was flame sprayed. The flame-activated primer bonded to the substrate and topcoat. No running down, shrinkage, or out-gassing were observed.

EXAMPLE 9 (INVENTION)
USE ELECTRONICALLY CAPPED AMINE WITH OTHER EPOXY

| RESIN (PART-A) | |
|---|---|
| Bis-F Epoxy (Epalloy 8220) | 100 |
| HARDENER (PART-B) | |
| (Imidazole derivative) EMI 24 | 15 |
| Amidoamine (Epicure 3164) | 70 |
| (aromatic diamine) MXDA | 10 |
| $Sb_2O_3$ | 1.0 |
| BT-93 | 3.0 |

The resin and hardener were mixed in a 2/1 (by weight) ratio and applied very thin on the steel substrate. The substrate was warmed to 150° F. by flame, and topcoat PF113 was flame sprayed. The flame-activated primer bonded to the substrate and topcoat. No running down, shrinkage, or out-gassing were observed.

EXAMPLE 10 (INVENTION)
USE OF ELECTRONICALLY CAPPED AMINE WITHOUT FIRE RETARDANT

| RESIN (PART-A) | |
|---|---|
| Bis-F Epoxy (Epalloy 8220) | 100 |
| HARDENER (PART-B) | |
| (Imidazole derivative) EMI 24 | 15 |
| Amidoamine (Epicure 3164) | 70 |
| (aromatic diamine) MXDA | 10 |

The resin and hardener were mixed in 2/1 (by weight) ratio and applied very thin on the steel substrate. The substrate was warmed to 150° F. by flame, and topcoat PF113 was flame sprayed. The flame-activated primer bonded to the substrate and topcoat. No running down, shrinkage, or out-gassing were observed.

EXAMPLE 11 (INVENTION)
USE OF ELECTRONICALLY CAPPED AMINE AND SOLVENT

| RESIN (PART-A) | |
|---|---|
| Bis-F Epoxy (Epon 862) | 100 |
| Xylene- | 400 |
| HARDENER (PART-B) | |
| (Imidazole derivative) EMI 24 | 15 |
| Amidoamine (Epicure 3164) | 70 |
| (aromatic diamine) MXDA | 10 |
| Xylene | 400 |

The resin and hardener were mixed in 2/1 (by weight) ratio. The material was mist sprayed over a metal substrate and allowed to dry for 15–20 minutes. The substrate was warmed to 150 F. by flame, and topcoat PF113 was flame sprayed. The flame-activated primer bonded to the substrate and topcoat. No running down, shrinkage, or out-gassing were observed.

EXAMPLE 12 (INVENTION)
USE OF ELECTRONICALLY CAPPED AMINE, CONCRETE SUBSTRATE

| RESIN (PART-A) | |
|---|---|
| Bis-F Epoxy (Epon 862) | 100 |
| HARDENER (PART-B) | |
| (Imidazole derivative) EMI 24 | 15 |
| Amidoamine (Epicure 3164) | 75 |
| (aromatic diamine) MXDA | 10 |
| Filler (Nanocor I.28E) | 30 |
| Antioxidant (Irganox 1010) | 1.5 |

Note
a formulation as in Example 10 or 11 will provide good results when used on concrete which has been previously coated such as with epoxy, vinyl ester, or polyester. For porous concrete, a different formulation is needed, as described below.

I.28E is a treated clay obtained from Nanocor, Inc. Irganox 1010 was obtained from Ciba Specialty Chemicals Corporation.

The concrete was warmed up 15–20° F. above ambient temperature. The resin and hardener (2/1.32 by weight, adjusted 2/1-ratio for added filler & antioxidant) were mixed thoroughly to a paste consistency and applied over bare concrete to a thickness of 30 mils. The material was cured overnight at ambient temperature. The topcoat (PF113) was flame sprayed. The bond between concrete and the primer was good. However, the topcoat bonding was somewhat poor quality.

EXAMPLE 13 (INVENTION)
ELECTRONICALLY CAPPED AMINE, FILLER AND CONCRETE SUBSTRATE

| RESIN (PART-A) | |
|---|---|
| Bis-F Epoxy (Epon 862) | 100 |
| HARDENER (PART-B) | |
| (Imidazole derivative) EMI 24 | 15 |
| Amidoamine (Epicure 3164) | 75 |
| (aromatic diamine) MXDA | 10 |
| Filler (Nanocor I.28E) | 7.5 |
| EAA (Zn) | 30 |
| Antioxidant (Irganox 1010) | 1.5 |

EAA(Zn) is an ionomer, zinc salt of ethylene-acrylic acid copolymer.

Resin and hardener were mixed (2/1.39 by weight, ratio adjusted for added filler, antioxidant, and ionomer) thoroughly to a paste consistency and applied over bare concrete to a thickness of 30 mils. The material was cured overnight at ambient temperature. The topcoat (PF113) was flame sprayed. No out-gassing was observed. A good bond of the topcoat was obtained. No decomposition of base coat was observed.

While certain preferred embodiments of the invention have been described herein, the invention is not to be construed as being so limited, except to the extent that such limitations are found in the claims.

What is claimed is:

1. A coating system comprising
   a. a primer composition, and
   b. a thermoplastic coating deposited on the primer composition forming a top coat,
   wherein the primer composition comprises an epoxy resin cured by a combination of at least one fast acting reactive amine curing agent which has entered into cross-linking reactions with the epoxy resin to provide the partial cure of the epoxy resin, and at least one amine curing agent which has been flame or heat activated to remove a blocking of the amine functionality and which has further caused a complete cure of the epoxy resin, by either stoichiometric reaction or catalysis.

2. A coating system as in claim 1 wherein the thermoplastic coating comprises an olefinic coating.

3. A coating system as in claim 2 wherein wherein the olefinic coating contains carboxyl functionality.

4. A coating system as in claim 2 wherein the olefinic coating is selected from the group consisting of a polyolefin and a poly-α-olefin.

5. A coating system as in claim 4 wherein the polyolefin comprises a polyethylene containing an acrylic acid comonomer.

6. A coating system as in claim 1 wherein the thermoplastic coating has a thickness in the range of from about 1 mil to about 100 mils.

7. A coating system as in claim 1 wherein the thermoplastic coating is flame sprayed onto the primer.

8. A primer composition capable of being flame activated comprising
   a. an epoxy resin having terminal epoxy groups,
   b. a fast acting amine curing agent for reacting with terminal epoxy groups of the epoxy resin and partially curing the composition; and
   c. an amine curing agent capable of being flame activated and having blocked amine functionality for stoichiometric or catalytic reaction of the remaining portion of the terminal epoxy groups upon being activated and providing a complete cure of the curable primer compositions,
   wherein a sufficient amount of the fast acting amine is present to react with in the range of from about 10% to about 90% of the terminal epoxy groups of the epoxy resin.

9. A primer composition as in claim 8 wherein the epoxy resin is Bis-A or Bis-F type.

10. A primer composition as in claim 8 wherein the amine curing agent capable of being flame activated comprises, after flame activation, a reactive curing agent, and said amine curing agent capable of being flame activated is present in adequate amount to provide a near-stoichiometric amount of active amine curing agent, to react all epoxy groups remaining in the composition after reaction with the fast acting amine curing agent.

11. A primer composition as in claim 8, wherein the amine curing agent capable of being flame activated comprises, after activation, a catalytic curing agent, and said amine curing agent capable of being flame activated is present in adequate amount to provide an amount of active amine curing agent, to react all the epoxy groups remaining in the composition after reaction with the fast acting amine curing agent near instantaneously.

12. A primer composition as in claim 8 further comprising from about 0.1 percent to about 10 percent by weight of a fire retardant.

13. An amine curing agent comprising
   a. at least one fast acting amine curing agent for reactively crosslinking terminal functional groups of an epoxy resin, and b. at least one amine curing agent capable of being flame activated and having blocked amine functionality for reacting with or catalyzing reaction of terminal epoxy groups of an epoxy resin after activation by flame.

14. An amine curing agent as in claim 13 wherein the at least one fast acting amine curing agent comprises a polyamine, a polyamide, or a polyamidoamine having from 6 to 20 carbon atoms and comprising multiple terminal amino groups.

15. An amine curing agent as in claim 13 wherein the at least one fast acting amine curing agent comprises meta-xylenediamine.

16. An amine curing agent as in claim 13 wherein the at least one amine curing agent capable of being flame activated comprises multiple terminal amino groups which have been blocked by carbamate or carboxyl functional groups.

17. An amine curing agent as in claim 13 wherein the at least one amine curing agent capable of being flame activated comprises hexamethylene diamine or 4,4'-methylenebis(cyclohexylamine) blocked by carbamate functional group.

18. An amine curing agent as in claim 13 wherein the amine curing agent capable of being flame activated comprises 2-methyl-4-ethylimidazole.

19. A primed substrate comprising
 a. a substrate, and
 b. a partly cured curable primer composition on the substrate, wherein said primer composition comprises
  i. an epoxy resin having both reactive terminal epoxy groups and reacted terminal epoxy groups, wherein the reacted terminal epoxy groups have been reacted with a fast acting amine curing agent to provide the partial cure of the partly cured primer composition, and
  ii. an amine curing agent capable of being flame activated and having blocked amine functionality for reacting with or catalyzing reaction of the reactive terminal epoxy groups of the epoxy resin upon being activated by flame so as to provide a complete and near instantaneous cure of the curable primer composition.

20. A primed substrate as in claim 19 wherein the substrate comprises steel and the partly cured curable primer composition is on the steel at a thickness in the range of from a monolayer thickness up to about 10 mils.

21. A primed substrate as in claim 20 wherein the substrate comprises steel and the partly cured curable primer composition is on the steel at a thickness in the range of from a monolayer thickness up to about 1 mil.

22. A primed substrate as in claim 19 wherein the substrate comprises concrete and the partly cured curable primer composition is on the concrete at a thickness in the range of from about 1 mil to about 100 mils.

23. A primed substrate as in claim 22 wherein the substrate comprises concrete and the partly cured curable primer composition is on the concrete at a thickness in the range of from about 5 mil to about 50 mils.

24. A method for coating a substrate, said method comprising
 a) providing a substrate surface which is substantially free of loose, unsound, poorly adhered, contaminated and/or detrimental matter including oils and grease;
 b) applying a layer of primer to said substrate surface, said primer comprising
  i. an epoxy resin having terminal epoxy groups,
  ii. a fast acting amine curing agent for reacting with a first portion of the terminal epoxy groups of the epoxy resin and partially curing the curable composition; and
  iii. an amine curing agent capable of being flame activated and having blocked amine functionality for reacting with or catalyzing reaction of a second portion of the terminal epoxy groups upon being activated and providing a complete cure of the curable primer composition; and
 c) flame spraying a layer of molten thermoplastic resin onto the layer of primer under conditions to activate the amine curing agent capable of being flame activated and provide a complete cure of the primer.

25. A method as in claim 24 wherein the substrate is steel which has been lightly cleaned by mechanical means other than heavy sand-blasting.

26. A method as in claim 25 wherein the substrate has some rust bloom.

27. A method as in claim 25 wherein the primer is applied to the substrate to a thickness in the range of from about a monolayer to about 1 mil by spray technique.

28. A method as in claim 26 wherein the substrate is concrete which has been nonmechanically cleaned.

29. A method as in claim 28 wherein the primer is applied to the substrate to a thickness in the range of from about 5 to about 50 mils.

30. A method as in claim 24 wherein the thermoplastic resin comprises an olefinic polymer.

31. A method as in claim 30 wherein the olefinic polymer comprises a copolymer of ethylene and an acrylic acid.

32. A method as in claim 31 wherein the epoxy resin is selected from Bis-A or Bis-F type.

33. A coated substrate comprising
 a. a substrate,
 b. a primer composition deposited on the substrate, and
 c. a thermoplastic coating deposited on the primer composition,
 wherein the primer composition comprises an epoxy resin cured by a combination of at least one fast acting reactive amine curing agent which has entered into cross-linking reactions with the epoxy resin to provide the partial cure of the epoxy resin, and
 at least one amine curing agent which has been flame activated to remove a physical or electronic blocking of the amine functionality and which has further caused a complete cure of the epoxy resin, by either stoichiometric reaction or catalysis.

34. A coated substrate as in claim 33 wherein the thermoplastic coating comprises an olefinic coating.

35. A coated substrate as in claim 34 wherein wherein the olefinic coating contains carboxyl functionality.

36. A coated substrate as in claim 33 wherein the olefinic coating is selected from the group consisting of a polyolefin and a poly-α-olefin.

37. A coated substrate as in claim 36 wherein the coating is polyethylene containing an acrylic acid comonomer.

38. A coated substrate as in claim 33 wherein the thermoplastic coating has a thickness in the range of from about 1 mil to about 100 mils.

39. A coated substrate as in claim 33 wherein the thermoplastic coating is flame sprayed onto the primer.

* * * * *